United States Patent
Kawata

(10) Patent No.: US 6,738,111 B2
(45) Date of Patent: May 18, 2004

(54) ARM PORTABLE INFORMATION APPARATUS

(75) Inventor: Masayuki Kawata, Chiba (JP)

(73) Assignee: Seiko Instruments Inc., Chiba (JP)

( * ) Notice: Subject to any disclaimer, the term of this patent is extended or adjusted under 35 U.S.C. 154(b) by 52 days.

(21) Appl. No.: 09/915,428

(22) Filed: Jul. 26, 2001

(65) Prior Publication Data

US 2002/0047952 A1 Apr. 25, 2002

(30) Foreign Application Priority Data

Aug. 3, 2000 (JP) .......................................... 2000-235856

(51) Int. Cl.⁷ .............................................. G02F 1/1333
(52) U.S. Cl. ............................ 349/58; 368/82; 368/294
(58) Field of Search ........................... 349/58, 200, 13; 368/82, 88, 294, 295, 296

(56) References Cited

U.S. PATENT DOCUMENTS 6,292,239 B1 * 9/2001 Nagamura et al. ............ 349/58
6,532,152 B1 * 3/2003 White et al. ................. 361/692

FOREIGN PATENT DOCUMENTS

| JP | 361160725 A | * | 7/1986 |
| JP | 2000-293117 | * | 10/2000 |

* cited by examiner

Primary Examiner—Tarifur R. Choudhury
Assistant Examiner—Thoi V. Duong
(74) Attorney, Agent, or Firm—Adams & Wilks

(57) ABSTRACT

An arm portable information apparatus has a case and a film liquid crystal device disposed in the case and having a pair of opposite side edge portions. A pair of support members are connected to the case and support the film liquid crystal device. Each of the support members has at least one groove receiving a respective one of the side edge portion of the film liquid crystal device so that the film liquid crystal device does not contact any part of the arm portable information apparatus except for the contact between the support members and the side edge portions of the film liquid crystal device.

17 Claims, 7 Drawing Sheets

ARM PORTABLE INFORMATION APPARATUS

BACKGROUND OF THE INVENTION

1. Field of the Invention

The present invention relates to an arm portable information apparatus, such as an electronic watch and a cellular phone, adapted to a display information using a film liquid crystal device and which can prevent damage to the film liquid crystal device so that it can accurately perform a display operation.

2. Description of the Prior Art

In recent years, many film liquid crystal devices are used in an electronic information apparatus such as an electronic watch. Although this film liquid crystal device has an advantage in that the degree of freedom of arrangement is higher compared with a conventional liquid crystal display device using a hard glass substrate, it has a disadvantage in that it is fragile and its display is hard to see when it is bent. Thus, various ideas have been conventionally worked out for a packing structure of a film liquid crystal device.

FIG. 7 is a sectional view showing a packing structure of a conventional film liquid crystal device. This packing structure of a film liquid crystal device is disclosed in Japanese Patent Application Laid-open No. Hei 6-160820 gazette, and is a structure in which an upper surface of a housing 51 is formed in a curved surface 52 and a film liquid crystal device 53 is mounted along this curved surface 52. Reference numeral 55 denotes a back cover and reference numeral 56 denotes a circuit block. The periphery of the film liquid crystal device 53 is biased to the above-mentioned curved surface 52 by a pressing member 54 having elasticity. Thus, the entire film liquid crystal device 53 contacts the curved surface 52 of the housing 51 to be fixed in a bent state along the curved surface 52.

However, there is a problem in that, since the film liquid crystal device 53 is caused to contact the curved surface 52 of the housing 51 to be supported in the above-mentioned packing structure of a film liquid crystal device, the film liquid crystal device 53 is likely to be damaged due to vibration when it is mounted or carried. In addition, in the case in which the film liquid crystal device 53 is actually supported in a bent state on the curved surface 52 of the housing 51, since a central part of the film liquid crystal device 53 is deformed to take a saddle-like shape, the central part is biased to the housing curved surface. Thus, there is a problem in that a cell gap of liquid crystal is changed and therefore it becomes difficult to perform display.

SUMMARY OF THE INVENTION

Thus, the present invention has been devised in view of the above-mentioned problems in the conventional art, and it is an object of the present invention to provide an arm portable information apparatus that can prevent damage to the film liquid crystal at the tine of mounting, carrying or the like and can accurately perform display as well.

In order to attain the above-mentioned object, an arm portable information apparatus in accordance with the present invention is an arm portable information apparatus, wherein grooves are formed in a bent state on sides of elongated supporting members, a film liquid crystal device is held by the supporting members such that both side edges of the film liquid crystal device are fit in these grooves, and the supporting members are attached to an attaching portion provided in a case such that the film liquid crystal device becomes non-contact.

In addition, an arm portable information apparatus in accordance with the present invention is an arm portable information apparatus, wherein grooves for holding an illumination panel on the above-mentioned supporting members are further formed in a bent state below the grooves in which the above-mentioned film liquid crystal device is fit and a predetermined space apart from these grooves in the above-mentioned arm portable information apparatus.

In addition, an arm portable information apparatus in accordance with the present invention is an arm portable information apparatus, wherein grooves in which the above-mentioned film liquid crystal device is fit are further provided in a plurality of layers in the above-mentioned arm portable information apparatus.

In addition, an arm portable information apparatus in accordance with the present invention is an arm portable information apparatus, wherein legs for supporting parts of the film liquid crystal apparatus are further provided in the grooves in which the above-mentioned film liquid crystal device is fit in the above-mentioned arm portable information apparatus.

In addition, an arm portable information apparatus of the present invention is an arm portable information apparatus, wherein elongated first supporting members that are formed in a bent state are fixed to an attaching portion of a case, both edges of a film liquid crystal device are supported by these supporting members, and second supporting members are mounted on both the edges of this film liquid crystal device and, at the same time, these second supporting members are fixed to the above-mentioned attaching portion.

In addition, an arm portable information apparatus in accordance with the present invention is an arm portable information apparatus, wherein grooves in which an upper polarizing plate of the film liquid crystal device is fit separately from the film liquid crystal device are provided above the above-mentioned grooves in which the film liquid crystal device is fit in the above-mentioned arm portable information apparatus.

BRIEF DESCRIPTION OF THE DRAWINGS

A preferred form of the present invention is illustrated in the accompanying drawings in which.

DETAILED DESCRIPTION OF THE PREFERRED EMBODIMENTS

The present invention will be hereinafter described in detail with reference to drawings. Further, the present invention is not limited by this embodiment.

Figure 1:
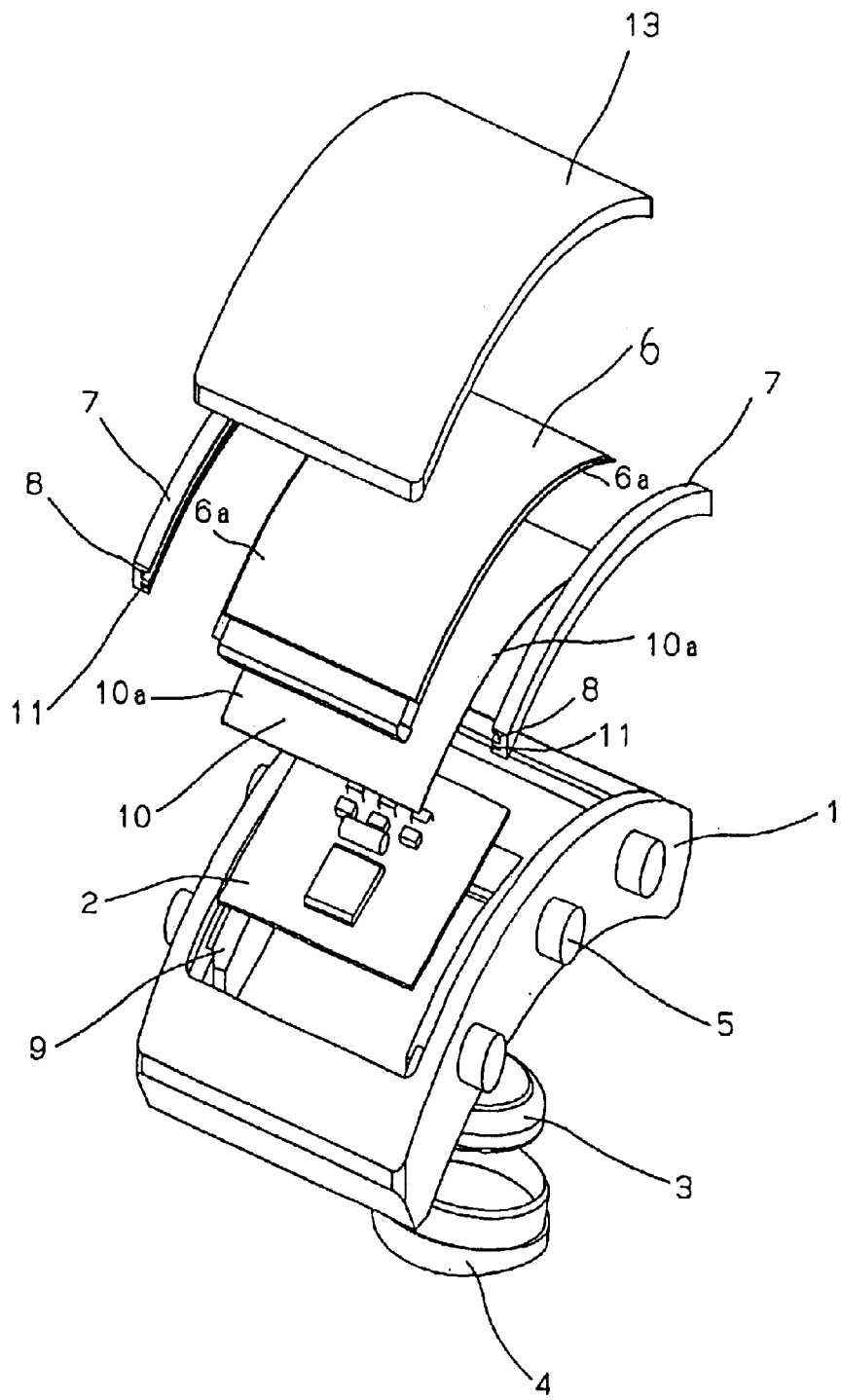
FIG. 1 is an assembling view showing an arm portable information apparatus in accordance with an embodiment of the present invention.

FIG. 1 is an assembling view showing an arm portable information apparatus in accordance with an embodiment of the present invention.

Figure 2:
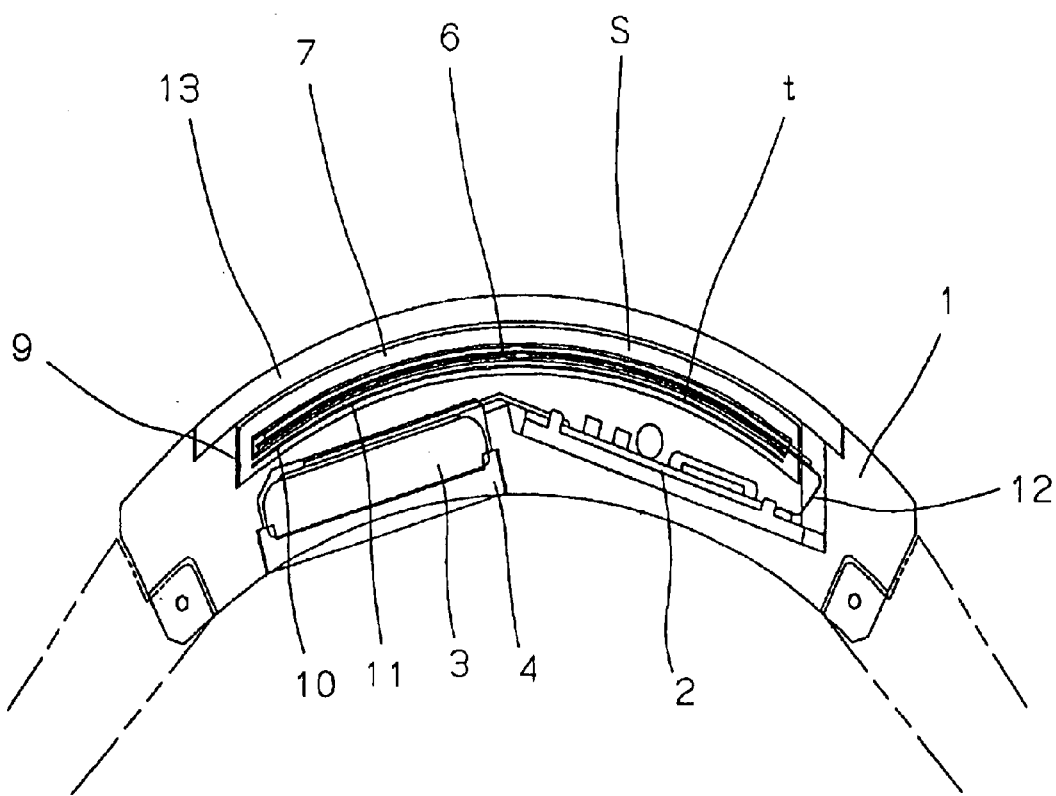
FIG. 2 is a sectional view of the arm portable information apparatus shown in FIG. 1.
Figure 3:
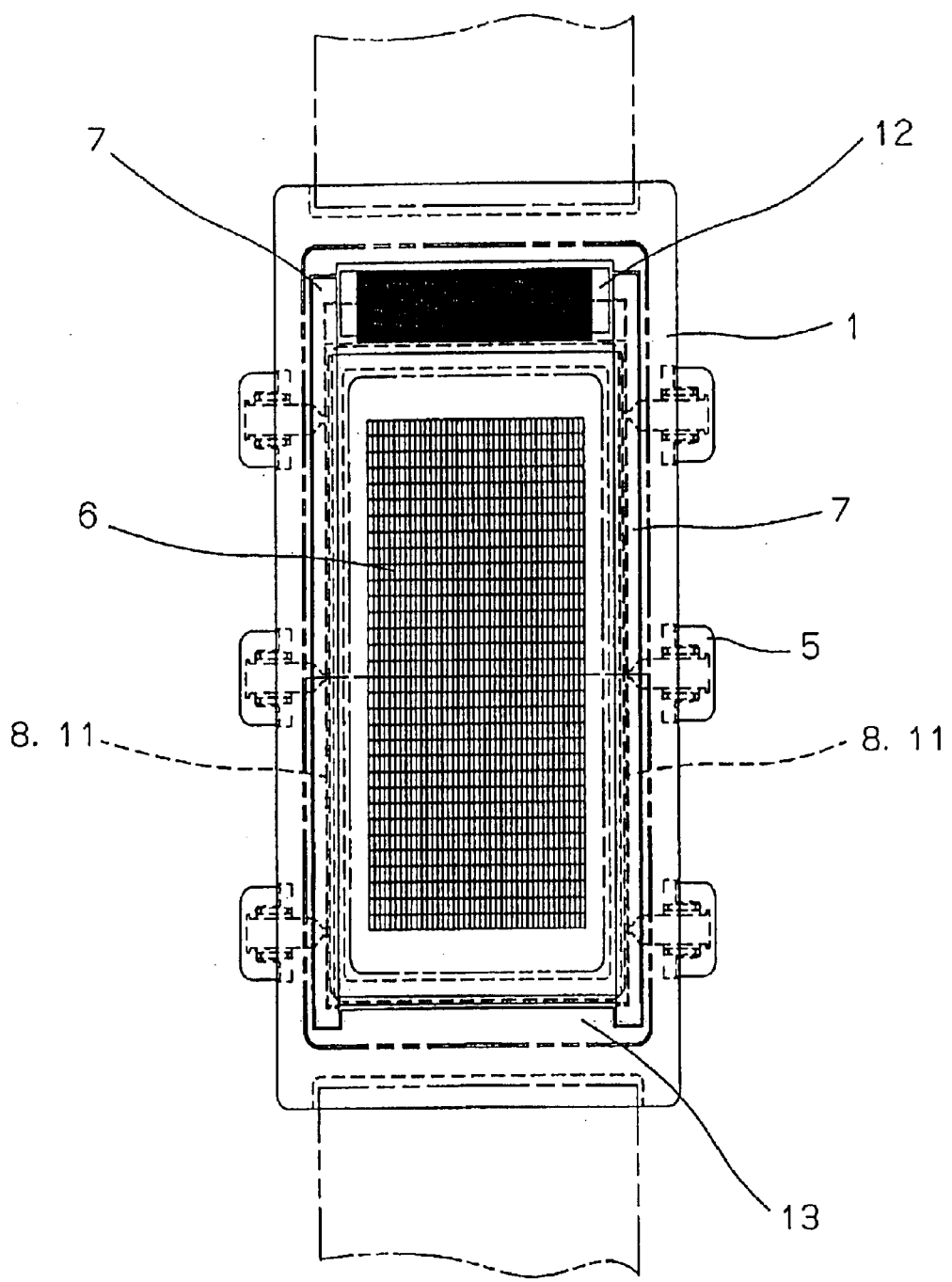
FIG. 3 is a plan view of the arm portable information apparatus shown in FIG. 1.

FIG. 2 is a sectional view of the arm portable information apparatus shown in FIG. 1. FIG. 3 is a plan view of the arm portable information apparatus shown in FIG. 1. This arm portable information apparatus is provided with a case 1 having a curved shape, a circuit block 2 to be housed inside this case 1, and a battery 3 to be housed in a part of the case 1. A battery cover 4 is attachably provided on the bottom surface of the case 1. In addition, an operation button 5 is provided on the side of the case 1. In addition, a film liquid crystal device 6 for performing digital display is housed inside the case 1. Both side edges 6a of this film liquid crystal device 6 are fit in upper grooves 8 provided in curved supporting members 7. Further, since a structure of this film liquid crystal device 6 itself is publicly known, descriptions of its details are omitted. In addition, these supporting members 7 are fixed to an attaching portion 9 that are made of resin and provided on the inner surfaces of the case 1. A method of fixing the supporting members 7 to the attaching portion 9 may be a well-known fitting structure or may be adhesion.

In addition, an EL panel 10 to be an illumination of liquid crystal display is arranged below the film liquid crystal device 6. This EL panel 10 also has its side edges 10a fit in lower grooves 11 of the supporting members 7 and is housed in the case 1. The film liquid crystal device 6 and the EL panel 10 are connected to the circuit block 2 by a printed-wiring film 12. Further, a back light unit (not shown) which is composed of a light guide plate and an LED can be employed instead of the EL panel 10. In addition, a curved cover glass 13 is fit on the upper most surface of the case 1. The film liquid crystal device 6 forms an opening S between itself and the cover glass 13 in a state in which the supporting members 7 are fixed to the attaching portion 9, and never contacts the cover glass 13. In addition, since a predetermined interval t is provided from the upper grooves 8 to the lower grooves 11 between the EL panel 10 and the film liquid crystal device 6, the EL panel 10 and the film liquid crystal device 6 never contact each other. The above-mentioned interval t varies depending on a product to which the EL panel 10 and the film liquid crystal device 6 are applied and design conditions and, more specifically, the interval in the order of 0.8 mm to 1.5 mm is sufficient.

As described above, according to this arm portable information apparatus, the film liquid crystal device 6 is supported by the supporting members 7 on its both sides and is arranged not to contact the cover glass 13 positioned above and the EL panel 10 positioned below. Thus, the film liquid crystal device 6 is not easily damaged by vibration when it is attached or carried. In addition, since a central part of the film liquid crystal device 6 is held non-contact, a cell gap is not easily changed. Thus, indistinct liquid crystal display can be prevented. Further, the above-mentioned supporting members 7 may be formed such that a curved portion is provided only on the upper part to have a semicylindrical cross section because it is bent overall(illustration is omitted). In addition, in implementing the present invention, the supporting members 7 do not necessarily have to take a curved shape, but it is sufficient if substantially only the upper grooves 8 is bent and the lower grooves 11 are also bent if necessary. In addition, the supporting members 7 may be those formed by bending a wire-like material. Thus, the grooves 8 and 11 of the present invention include an elongated annular shape that is formed by bending a wire.

Figure 4:
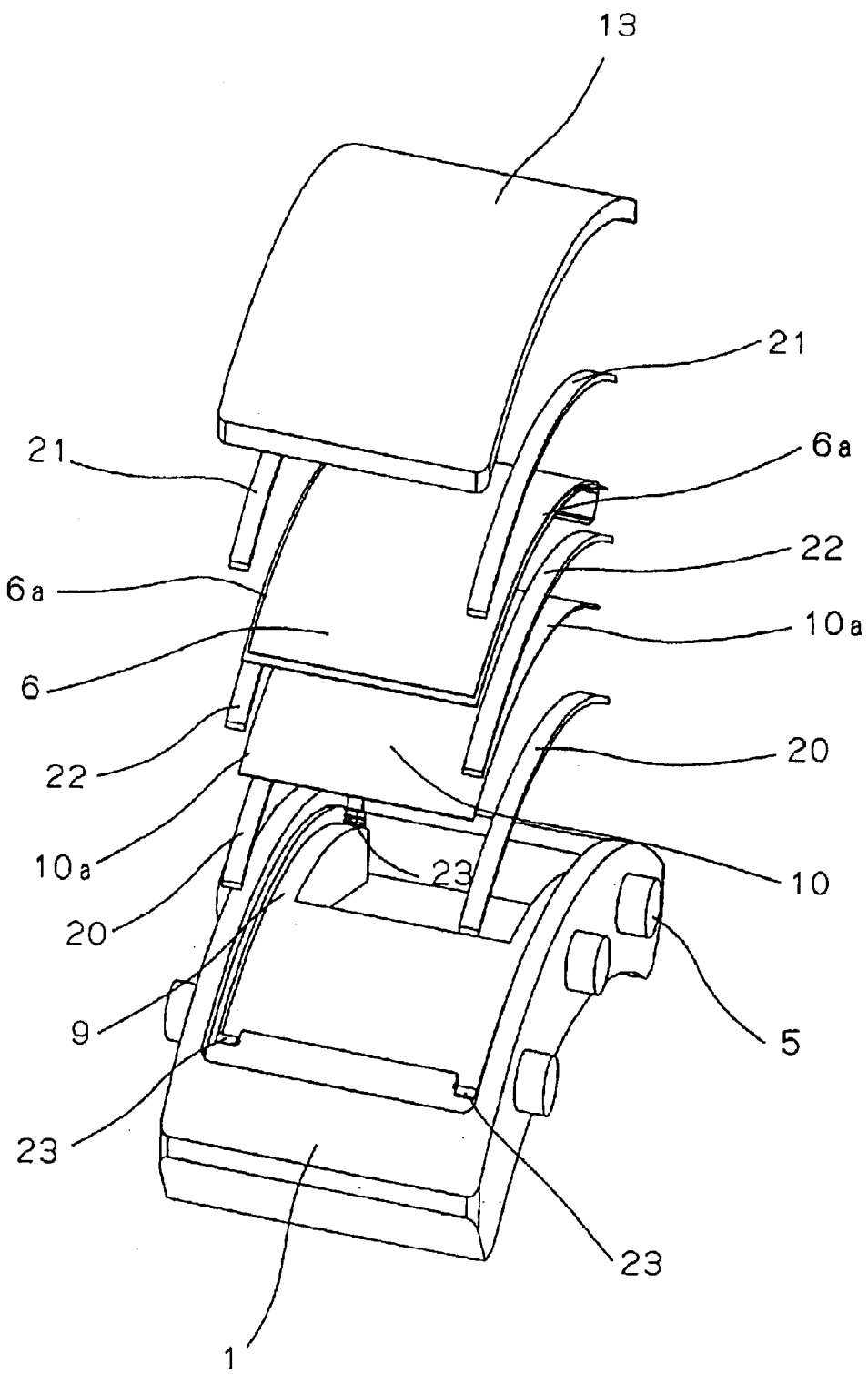
FIG. 4 is an assembling view showing a modification example of the arm portable information apparatus shown in FIG. 1.

FIG. 4 is an assembling view showing a modification example of the arm portable information apparatus shown in FIG. 1. As shown in this figure, supporting members 20 and 21 have divided structures and, at the same time, spacers 22 are arranged between a film liquid crystal device 6 and an EL panel 10. The divided supporting members 20 and 21 are fit and fixed in an attaching portion 9 provided on sides inside a case 1. The attaching portion 9 is provided with a plurality of protrusions 23 for fixing the supporting members 20 and 21 to the case 1. First, the lower supporting members 20 are fixed to the attaching portion 9, and the EL panel 10 is mounted on the lower supporting member 20. Next, the curved spacers 22 are arranged on and fixed to side edges 10a of the EL panel 10, and the film liquid crystal device 6 are mounted on this spacers 22. Then, the upper supporting members 21 are mounted on side edges 6a of the film liquid crystal device 6 and fixed to the above-mentioned attaching portion 9. Thus, it becomes possible to house the film liquid crystal device 6 in a bent state. In addition, openings can be provided between the EL panel 10 and the film liquid crystal device 6 as well as between the film liquid crystal device 6 and the cover glass 13. Further, the above-mentioned spacers 22 are equivalent to first supporting members in the scope of patent claim and the upper supporting members 21 are equivalent to second supporting members. If the EL panel 10 is not attached, it is sufficient that the film liquid crystal device 6 is sandwiched by the lower supporting members 20 and the upper supporting members 21. In this case, the lower supporting members 20 are equivalent to the first supporting members in the scope of patent claim and the upper supporting members 21 are equivalent to the second supporting members.

Figure 5:
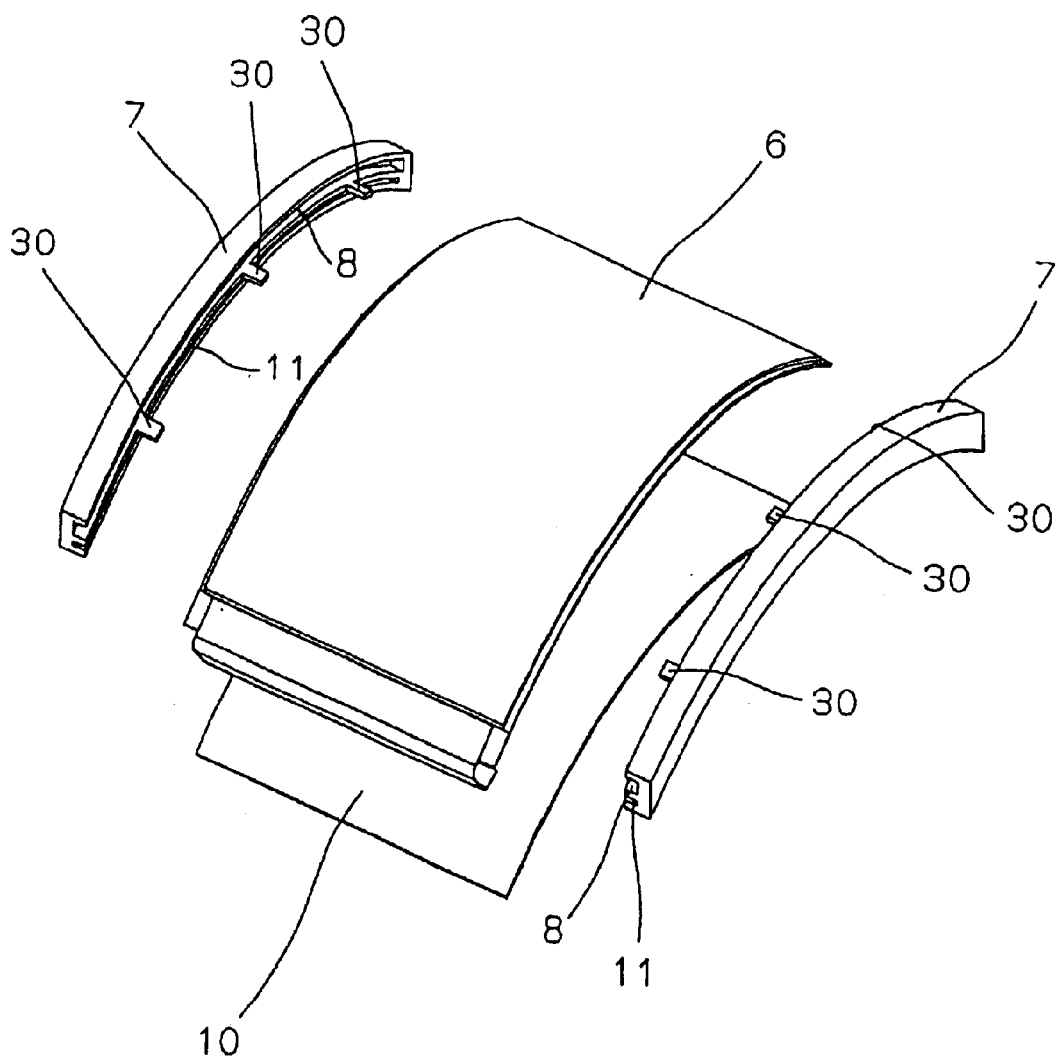
FIG. 5 is an assembling view showing another modification example of the arm portable information apparatus shown in FIG. 1.

FIG. 5 is an assembling view showing another modification example of the arm portable information apparatus shown in FIG. 1. As shown in this figure, legs 30 for supporting parts of a film liquid crystal device 6 slightly inside from side edges 6a protrude from the parts below upper grooves 8 of supporting members 7. With these legs 30, a film liquid crystal device 6 is prevented from falling into deeper inside at the time of assembling, and at the same time, the film liquid crystal device 6 is prevented from coming off from the upper grooves 8 due to shock of a drop. In addition, lower grooves 11 may not be included to arrange the EL panel 10 in a plane state, although this is not shown. Moreover, film liquid crystal devices 6 maybe laminated in two layers. This can be realized by forming a plurality of upper grooves 8, in which the film liquid crystal devices 6 are fit, in the supporting members 7 (illustration is omitted). In such a configuration, an opening is provided between each film liquid crystal device 6 to make the film liquid crystal devices 6 non-contact. A liquid crystal display can be easily laminated, and more complex display becomes possible by using the supporting members 7 as described above.

Figure 6:
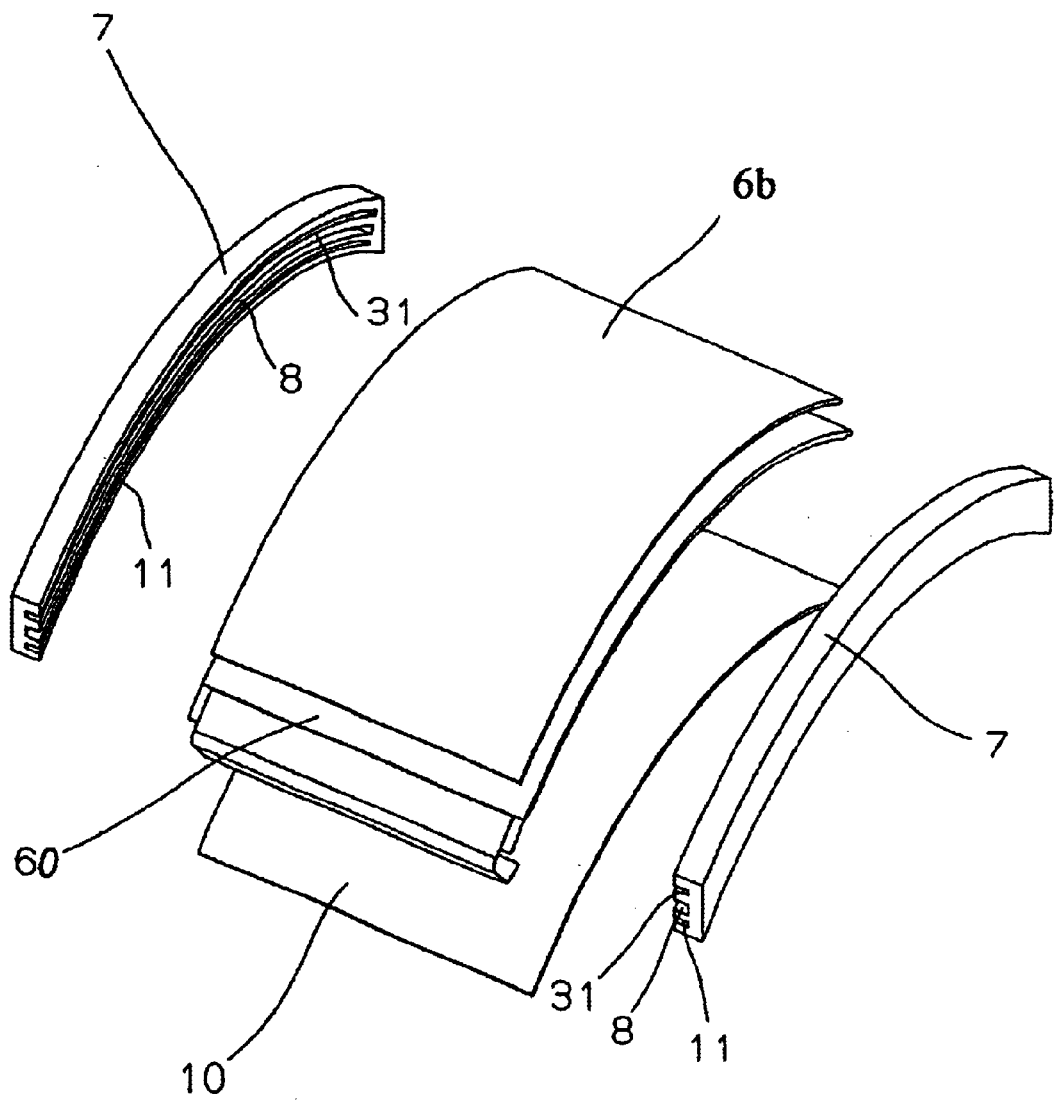
FIG. 6 is an assembling view showing another modification example of the arm portable information apparatus shown in FIG. 1.
Figure 7:
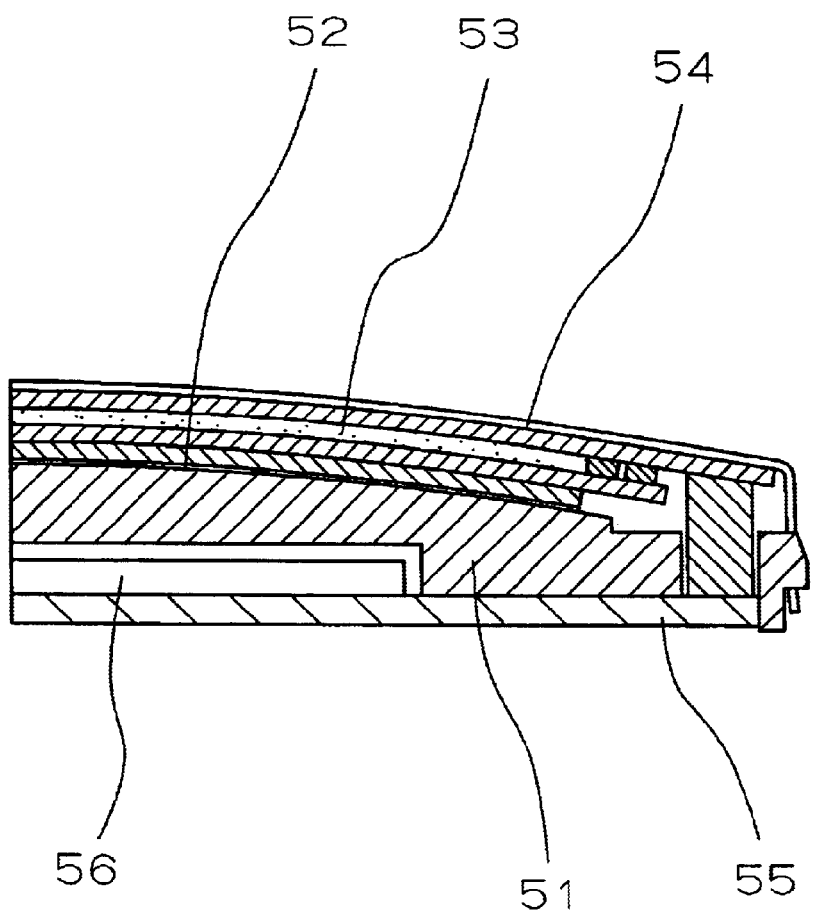
FIG. 7 is a sectional view showing a packing structure of a conventional film liquid crystal device.

FIG. 6 is an assembling view showing another modification example of the arm portable information apparatus shown in FIG. 1. As shown in this figure, polarizing plate fixing grooves 31 for separating and fitting an upper polarizing plate 6b, which is a component of a film liquid crystal device 6, are provided above upper grooves 8 of supporting members 7. The upper polarizing plate 6b is fixed to these polarizing plate fixing grooves 31 and, below the polarizing plate fixing grooves 31, a film liquid crystal device 60 composed of a polarizing plate other than the upper polarizing plate 6b is fixed to the upper grooves 8 of the supporting members 7. By separating the film liquid crystal device 60 composed of the upper polarizing plate 6b from that composed of a polarizing plate other than the upper polarizing plate 6b and fixing them in this way, hardness of the film liquid crystal devices 60 can be reduced and, as a result, stress can be relaxed when they are bent. Thus, the film liquid crystal devices 60 are bent more easily.

As described above, in the arm portable information apparatus of the present invention, since grooves are formed in a bent state on sides of elongated supporting members, a film liquid crystal device is held by the supporting members such that both side edges of this film liquid crystal device are fit in these grooves, and the supporting members are attached to an attaching portion provided in a case such that the film liquid crystal device becomes non-contact, damages to film liquid crystal can be prevented at the time of mounting, carrying or the like and display can be surely performed as well.

In addition, in the arm portable information apparatus of the present invention, since grooves for holding an illumination panel on supporting members are formed in a bent state below the grooves in which the above-mentioned film liquid crystal device is fit and a predetermined space apart from these grooves, a back light can be attached to a preferable position.

In addition, in the arm portable information apparatus of the present invention, since grooves in which a film liquid crystal device is fit are further provided in a plurality of layers, more complex display becomes possible.

In addition, in the arm portable information apparatus of the present invention, legs for supporting parts of a film liquid crystal apparatus are provided in grooves in which the film liquid crystal device is fit, the film liquid crystal device is prevented from coming off at the time of dropping or the like.

In addition, in the arm portable information apparatus of the present invention, elongated first supporting members that are formed in a bent state are fixed to an attaching portion inside the case, both edges of a film liquid crystal device are supported by these supporting members, and second supporting members are mounted on both the edges of this film liquid crystal device and, at the same time, these second supporting members are fixed to the above-mentioned attaching portion. Thus, damages to the film liquid crystal device can be prevented at the time of mounting, carrying or the like and display can be surely performed as well.

In addition, in the arm portable information apparatus of the present invention, polarizing plate fixing grooves for separating and fitting an upper polarizing plate, which is a component of a film liquid crystal device, are provided above upper grooves of supporting members, and the film liquid crystal device composed of the upper polarizing plate is separated from that composed of a polarizing plate other than the upper polarizing plate and fixed, hardness of the film liquid crystal devices can be thereby reduced and, as a result, stress can be relaxed when they are bent.

What is claimed is:

1. An arm portable information apparatus comprising: a case; a film liquid crystal device disposed in the case and having a pair of opposite side edge portions; and a pair of support members connected to the case and supporting the film liquid crystal device, each of the support members having a preselected radius of curvature and having at least one groove receiving a respective one of the side edge portions of the film liquid crystal device so that the film liquid crystal device is supported by the support members in a bent state at the preselected radius of curvature and does not contact any part of the arm portable information apparatus except for the contact between the support members and the side edge portions of the film liquid crystal device.

2. An arm portable information apparatus according to claim 1; further comprising an illumination panel supported in the case by the support members and having a pair of opposite side edge portions; and wherein the at least one groove of each of the support members comprises a pair of grooves each receiving one of the side edge portions of a respective one of the film liquid crystal device and the illumination panel, the pair of grooves of each support member being spaced-apart from one another so that the film liquid crystal device does not contact the illumination panel.

3. An arm portable information apparatus according to claim 1; wherein each of the support members is connected to a surface of the case having the preselected radius of curvature.

4. An arm portable information apparatus according to claim 1; wherein each of the support members has a plurality of leg portions supporting the respective side edge portion of the film liquid crystal device.

5. An arm portable information apparatus according to claim 1; wherein each of the grooves of the support members has the preselected radius of curvature and receives the respective side edge portion of the film liquid crystal device so that the film liquid crystal device is supported in a bent state at the preselected radius of curvature.

6. An arm portable information apparatus according to claim 2; wherein both the film liquid crystal device and the illumination panel are supported by the support members in a bent state at the preselected radius of curvature.

7. An arm portable information apparatus according to claim 2; wherein each groove of the support members has the preselected radius of curvature and receives the respective side edge portions of the film liquid crystal device and the illumination panel so that both the film liquid crystal device and the illumination panel are supported in a bent state at the preselected radius of curvature.

8. An arm portable information apparatus according to claim 2; wherein the pair of grooves of each of the support members are spaced apart from one another at a distance in the range of 0.8 mm to 1.5 mm.

9. An arm portable information apparatus comprising: a case; a film liquid crystal device disposed in the case and having a pair of opposite side edge portions; a polarizing plate disposed in the case and having a pair of opposite side edge portions; and a pair of support members connected to the case in confronting relation to one another and supporting the film liquid crystal device and the polarizing plate in spaced-apart relation, the support members having a first pair of confronting grooves each receiving respective ones of the side edge portions of the polarizing plate and a second pair of confronting grooves spaced apart from the first pair of grooves and receiving respective ones of the side edge portions of the film liquid crystal device so that the film liquid crystal device does not contact the polarizing plate and does not contact any part of the arm portable information apparatus except for the contact between the support members and the side edge portions of the film liquid crystal device.

10. An arm portable information apparatus according to claim 9; further comprising an illumination panel supported in the case by the support members and having a pair of opposite side edge portions; and wherein the support members have a third pair of confronting grooves each receiving respective ones of the side edge portions of the illumination panel.

11. An arm portable information apparatus according to claim 9; wherein each of the first and second grooves of the support members has a preselected radius of curvature and receives the respective side edge portion of the film liquid crystal device and the polarizing plate so that the film liquid crystal device and the polarizing plate are supported in a bent state at the preselected radius of curvature.

12. An arm portable information apparatus according to claim 9; wherein each of the first and second grooves of the support members has a preselected radius of curvature and receives the respective side edge portion of the film liquid crystal device and the polarizing plate so that the film liquid crystal device and the polarizing plate are supported in a bent state at the preselected radius of curvature.

13. An arm portable information apparatus according to claim 9; wherein the first and second grooves of each of the support members are spaced apart from one another at a distance in the range of 0.8 mm to 1.5 mm.

14. An arm portable information apparatus comprising: a case; a film liquid crystal device disposed in the case; an illumination panel disposed in the case and overlapping the film liquid crystal device; a first pair of support members connected to the case and supporting the film liquid crystal device so that the film liquid crystal device does not contact any part of the arm portable information apparatus except for the first pair of support members; a second pair of support members connected to the case and supporting the illumination panel; and a pair of spacing members disposed between the film liquid crystal device and the illumination panel and maintaining the film liquid crystal device and the illumination panel in spaced-apart relation to one another.

15. An arm portable information apparatus according to claim 14; wherein each of the first and second pairs of support members has a preselected radius of curvature and are connected to a surface of the case having the preselected radius of curvature; and wherein the film liquid crystal device and the illumination panel are supported by the first and second pairs of support members in a bent state at the preselected radius of curvature.

16. An arm portable information apparatus according to claim 14; wherein each of the spacing members has a thickness in the range of 0.8 mm to 1.5 mm.

17. An arm portable information apparatus according to claim 14; wherein the film liquid crystal device has a polarizing plate.

* * * * *